July 29, 1958 P. SCHELLER ET AL 2,845,271

RECORD CHANGING DEVICE

Filed June 16, 1954 2 Sheets-Sheet 1

INVENTORS
Paul Scheller,
Walter Aldenburg
and
Josef Ciniotti

INVENTORS

Paul Scheller,
Walter Aldenburg
and
Josef Cimiotti

United States Patent Office 2,845,271

Patented July 29, 1958

2,845,271

RECORD CHANGING DEVICE

Paul Scheller, Wuppertal-Barmen, and Walter Oldenburg and Josef Cimiotti, Kiel, Germany, assignors to Electroacustic G. m. b. H., Kiel, Germany, a German corporation Application June 16, 1954, Serial No. 437,169

4 Claims. (Cl. 274—10)

The present invention relates to supporting means for gramophone record discs in a record changing device, and is particularly directed to a device in which the record stack is supported by a spindle arranged centrally of the turn table.

It is an object of the invention to provide such a supporting spindle with means for the release of the temporarily lowest record, as well as with means for securing the penultimate record in its position while the discharge of the lowest record takes place.

Another object of the invention is the manufacture of a suporting spindle whose releasing means are actuated by a control rod which is longitudinally displaceable in the interior of the supporting spindle.

Another object of the invention is the provision of a record holding spindle that secures a stable support of the record stack without aditional support at the edges of the stack, and without the necessity of special means for ensuring lateral stability of the supporting spindle.

Another object of the invention is to devise a supporting spindle provided with symmetrically arranged supporting means on which the record stack rests while a record is being played, as well as with symmetrically arranged clamping means which reliably secure the penultimate record and the records on top of it in their position when the lowermost record is being dropped onto the turn table.

Still another object of the invention is to provide the supporting spindle with means which, after the last record has been dropped, prepare the subsequent automatic disconnection of the electric turn-table motor, which is to take place after that record has been played.

Additional features and advantages of the invention will be understood from a consideration of the following detailed description taken in connection with the accompanying drawings showing an embodiment of the invention by way of illustration. However, we wish to say that the invention is not confined to strict conformity with the showing of the drawings, but may be changed or modified as long as such changes or modifications mark no material departure from the salient features of the invention as expresed in the appended claims.

In the drawings, in which like parts are referred to by the same reference numerals, Fig. 1 is a vertical sectional view of the supporting spindle of a record changer arranged centrally of the turn table, a stack of record discs being positioned on the supporting means in normal position before the playing of a record has begun;

Figs. 2*a* to 2*c* show, partly in section, the principal parts of the supporting spindle;

Figures 1, 2A:
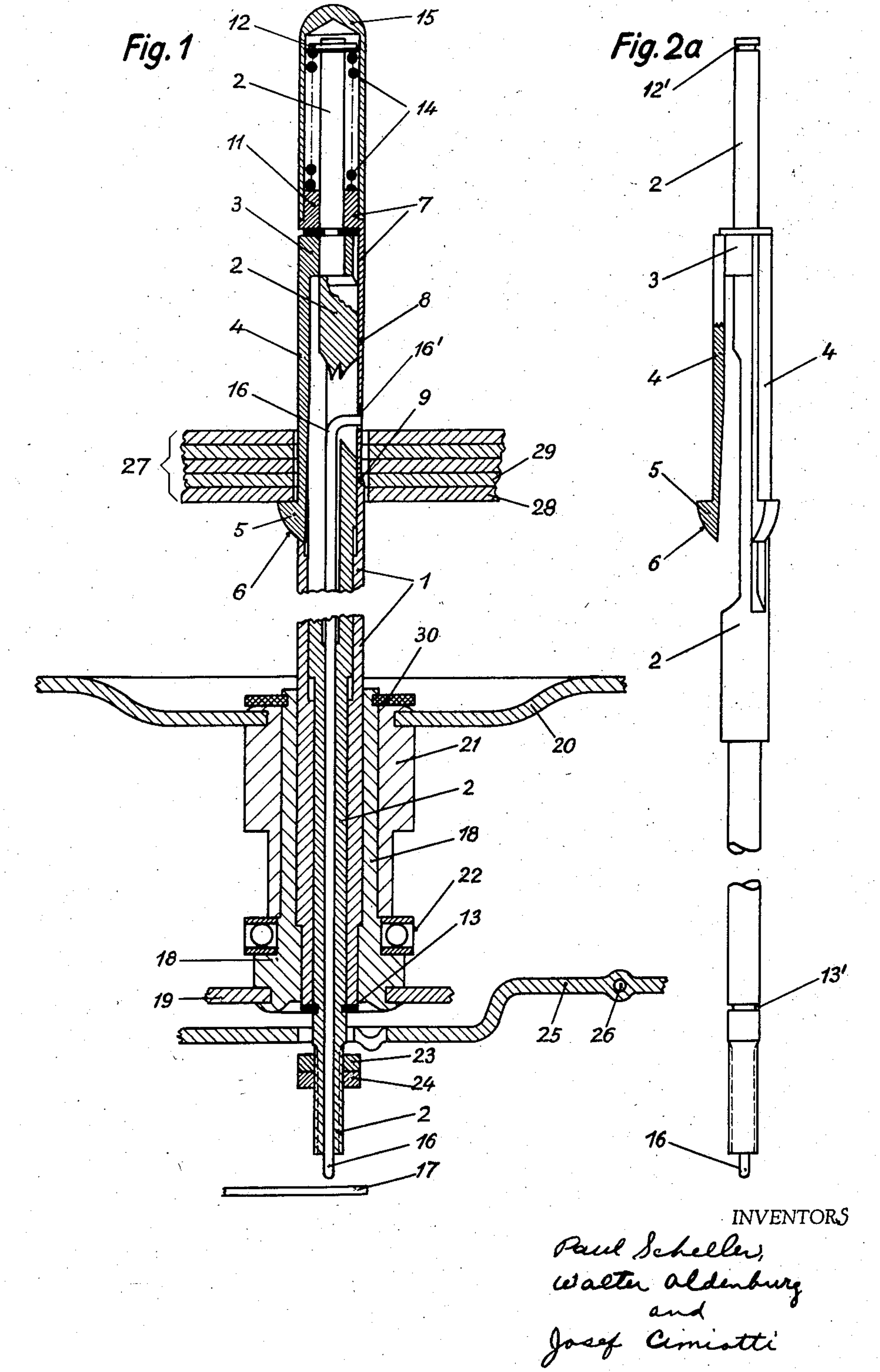

The illustrated apparatus comprises an outer tube 1 which forms the lower outer part of the supporting spindle of the record changing device. Lodged within tube 1 is a control rod 2, to which are fastened three supporting members 3 for the record stack 27. Each supporting member 3 has a spring arm 4 extending in downward direction and provided at its lower end with a nose 5. Nose 5 has a horizontal top face and a sloping lower surface 6. Mounted from above on the control rod 2 is a spring sleeve 7. Sleeve 7 is located above the supporting members 3 and carries three spring strips 8 separated from each other by longitudinal slots 4′ (Fig. 2*c*) which are engaged by the respective spring arms 4 of the supporting members 3. The spring strips 8 taper downwardly and have their respective lower ends provided with outwardly projecting portions 9 which serve for clamping the penultimate record 29 during record changing operation. The inwardly sloping slide faces 10 (Fig. 2*c*) at the projecting portions 9 normally rest against the outwardly sloping counter faces 10′ at the upper edge of the outer tube 1 whose upper end is provided with three longitudinal slots 5′ (Fig. 2*b*) through which the respective three noses 5 of the supporting members 3 project.

The spring sleeve 7 is not rigidly connected to the control rod 2 but is loosely mounted on the latter. An abutment disc 12 is rigidly fastened to the upper end of control rod 2, and a compression spring 14 is interposed between disc 12 and sleeve 7. The upper end of the supporting spindle is formed by a cap 15 embracing the upper end of control rod 2 and the upper portion 11 of spring sleeve 7. A disconnecting rod 16 is longitudinally displaceable in the hollow interior of the lower portion of the control rod 2. The upper end of rod 16 is rectagularly bent and extends into an opening 16′ of one of the spring strips 8, thus being rigidly connected to the strip.

The lower cylindrical end portion of the spindle tube 1 is inserted into a likewise cylindrical socket 18 which is rigidly secured to the mounting plate 19 of the record changing device. The hub bushing 21 of the turn table 20 is rotatably mounted on the cylindrical socket 18 with the aid of a ball-bearing 22, an annular member 30 serving to secure the table 20 in correct position with respect to its axis. The lower end of control rod 2 protrudes downwardly out of the lower end of tube 1. An abutment ring 13 fastened on control rod 2 limits the upward movement of the control rod under the pressure of the spring 14. Screwed onto the lower end of the control rod 2 are a nut 23 and a lock nut 24. The nut 23 serves as a shoulder for entraining a throw-off lever 25 which is rotatably mounted on a horizontal pivot rod 26 rigidly secured to the device.

Figures 2B, 2C, 3, 4:
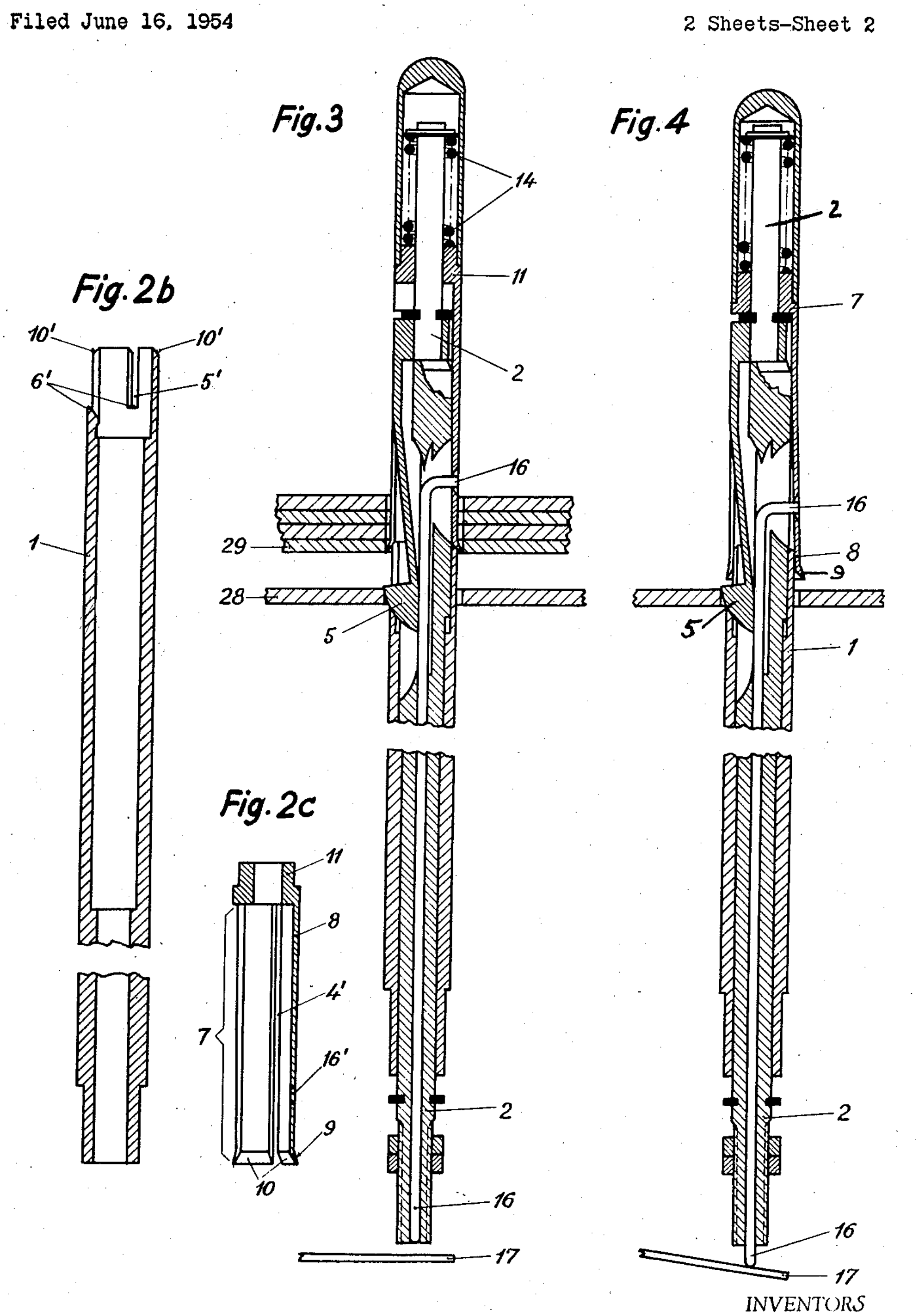
Fig. 3 is a vertical sectional view of the supporting spindle during the fall of the lowermost disc of the stack.
Fig. 4 is a vertical sectional view of the supporting spindle during the fall of the last record disc.

The release of a record disc from the spindle takes place as follows:

Normally, the lowermost record 28 of the record stack 27 rests upon the noses 5 of the supporting members 3. When this record is to be dropped, the throw-off lever 25, under the action of the driving mechanism, moves downward and bears against the nut 23, and thereby pulls the control rod 2 and the supporting members 3 in downward direction. During this downward movement the sloping lower faces 6 of the noses 5 move into engagement with the counter faces 6′ at the lower end of the slots 5′ (Fig. 2*b*). As a result, the noses 5 are pulled inward, and the lowermost record 28 is permitted to drop (Fig. 3). The downward movement of control rod 2 further causes the spring 14 to exert pressure upon the upper portion 11 of the spring sleeve 7 with the result that the slide faces 10 (Fig. 2*c*) at the lower ends of the spring strips 8 move into contact with the counter faces 10′ (Fig. 2*b*) at the upper end of the tube 1. This causes the spring strips 8 to be slightly displaced in outward direction, so that the projecting portions 9 (Fig. 1) are forced to bear against the inner edge of the penultimate record 29. This record is thus clamped in position, and the record stack on top of the penultimate record is prevented from dropping down. The provision of the spring 14 has the result that the spring sleeve 7 can move down only slightly, as long as the stack of records comprises at least two discs. When this is the case, the disconnecting rod 16 remains practically unchanged with respect to the mounting plate 19. From an inspection of Fig. 3 it will be seen that in this case the lower end of the rod 16 is practically flush with the lower end of control rod 2.

Fig. 4 shows the spindle assembly during the fall of the last record. Downward motion of the spring sleeve 7 is now no longer prevented by a record resting against its spring strips 8, so that the lower ends of the spring strips 8 can slip beyond the outer wall of the tube 1. As a result, the rod 16, fastened to one of the spring strips 8, moves likewise in downward direction, and its lower end moves out of the control rod 2 (see Fig. 4) and hits against the disconnecting lever 17, thereby preparing the disconnection of the electric driving mechanism when the playing of the last record has come to an end. For this purpose, the lever 17 acts upon a mechanism member (not shown) which acts upon the disconnect switch for the electric turn-table drive motor after the last record has been played. The intermediate member is movable between an active and an inactive position and is normally in its inactive position. It is moved into its active position only through actuation of lever 17 by rod 16 during the fall of the last record.

We claim:

1. A gramophone record changing device, comprising a turn-table spindle for supporting a stack of record discs, said spindle having an upright tubular member provided in its upper end with more than two longitudinal slots open at the top and located in different axial planes of said member, said member having between each two of said slots a top edge sloping downward in outward direction; a control rod longitudinally displaceable within said tubular member and projecting upwardly and downwardly out of said tubular member; inherently resilient supporting means rigidly secured to said control rod at a location above said tubular member and having as many arms as said tubular member has slots, said arms extending downwardly from said location in said different respective planes and being elastically displaceable radially in said respective planes, each of said arms having at its lower end a nose protruding outwardly through one of said respective slots of said tubular member, said noses having each a planar and normally horizontal top face for supporting the record stack and having an inwardly sloping side face; a sleeve axially displaceable on said control rod above said supporting means, a plurality of spring strips connected with said sleeve and extending downwardly therefrom, said spring strips being peripherally separated from each other so as to form longitudinal slots intermediate said strips, said arms of said supporting means normally extending into said respective intermediate slots, each of said spring strips having at its lower end an outwardly projecting portion for clamping the penultimate record of the stack and having an inwardly inclined slide edge underneath said projecting portion, said slide edge being engageable with said outwardly sloping upper edges of said tubular member; an abutment fastened to the upper end of said control rod, and a compression spring surrounding said control rod and having one end abutting against said abutment and the other end against said sleeve to exert pressure upon said sleeve.

2. A gramophone record changing device, comprising a mounting plate, a cylindrical socket rigidly fastened to said mounting plate and having a central vertical bore, a turntable rotatably mounted on said socket; a spindle mechanism for supporting a stack of record discs above said turntable, said spindle mechanism having a tubular member, said member having a cylindrical lower end portion in mating engagement with said bore of said socket so that said member extends upwardly away from said turntable and remains stationary during gramophone operation; said tubular member having an upper end provided with three slots open at the top and peripherally distributed so as to be located in different axial planes respectively, said member having between each two of said slots a top edge sloping downward in outward direction; a control rod longitudinally displaceable within said tubular member and projecting upwardly and downwardly out of said tubular member; inherently resilient supporting means rigidly secured to said control rod at a location above said tubular member and having three arms extending downwardly from said location in said three axial planes respectively so as to be elastically displaceable radially in said respective planes, each of said arms having at its lower end a nose projecting outwardly through one of said respective slots of said tubular member, said noses having each a substantially horizontal top face for supporting the record stack and having an inwardly sloping side face; a sleeve axially displaceable on said control rod above said supporting means, a plurality of spring strips connected with said sleeve and extending downwardly therefrom, said spring strips being peripherally separated from each other so as to form longitudinal slots intermediate said strips, said arms of said supporting means normally extending into said respective intermediate slots, each of said spring strips having at its lower end an outwardly projecting portion for clamping the penultimate record of the stack and having an inwardly inclined slide edge underneath said projecting portion, said slide edge being engageable with said outwardly sloping upper edges of said tubular member; an abutment fastened to the upper end of said control rod, and a compression spring surrounding said control rod and having one end abutting against said abutment and the other end against said sleeve to exert pressure upon said sleeve.

3. In a record changing device according to claim 1, said control rod having a longitudinal channel, turntable drive control means having a disconnect rod disposed in said channel and displaceable longitudinally thereof for preparing stoppage of gramophone operation after the last record of the stack is dropped, said disconnect rod having a top portion extending laterally away from said channel and fastened to one of said spring strips above the top of said tubular member.

4. A record changing device according to claim 2, comprising drive control means for said turntable, said drive control means having a drive-disconnecting lever mounted beneath the lower end of said tubular member in vertically spaced relation thereto, said control rod having in its lower portion a central axial channel, a disconnect rod disposed in said channel and displaceable axially thereof, said disconnect rod having a top portion extending laterally away from said channel and fastened to one of said spring strips above the top of said tubular member, said disconnect rod having its lower end normally spaced from said lever so as to be engageable therewith only when said disconnect rod is displaced downwardly, whereby dropping of the last record of the stack permits said compression spring to cause downward movement of said sleeve and said spring strips and said disconnect rod so that said disconnect rod hits against said lever and entrains it to thereby prepare stopping of the turntable.

References Cited in the file of this patent

FOREIGN PATENTS

| | | |
|---|---|---|
| 632,956 | Great Britain | Dec. 5, 1949 |
| 62,695 | Denmark | Sept. 18, 1944 |
| 112,686 | Sweden | Dec. 12, 1944 |
| 115,241 | Sweden | Oct. 23, 1945 |